Patented Sept. 10, 1935

2,013,873

UNITED STATES PATENT OFFICE 2,013,873

PRODUCTION OF AROMATIC AMINES OF THE BENZENE SERIES

Eberhard Vogt, Leuna, Germany, assignor to General Aniline Works, Inc., New York, N. Y., a corporation of Delaware No Drawing. Application January 26, 1934, Serial No. 708,500. In Germany February 8, 1933

7 Claims. (Cl. 260—130.5)

The present invention relates to a process for the production of aromatic amines of the benzene series.

In the U. S. Patent 1,935,209 there has been described a process for the production of amines from vapours of a phenol of the benzene series and of ammonia while heating in the presence of a dehydration catalyst under a pressure between 50 and 300 atmospheres. If crude raw materials are used the said process has the disadvantage that the activity of the catalyst decreases after some time.

I have now found that phenols of the benzene series may be converted in a very advantageous and technically satisfactory manner into the corresponding amines by passing them over dehydrating catalysts at elevated temperature and under increased pressure together with ammonia in the presence of gases comprising hydrogen. Hydrogen may be used alone as well as gases containing the same. In this manner it is possible to treat without special precautions also such initial materials as have been stored for long periods of time in usual containers, without deterioration of the catalysts.

The process is carried out in a corresponding manner to that described in the said patent with the use of the usual dehydrating catalysts such as hydrated alumina, if desired, while employing additions such as China clay. Hydrogen or gases containing the same are added in suitable proportions to the vaporous reaction mixture of phenols and ammonia. Usually at least 50 parts by volume of hydrogen are used per each part by volume of a phenol (specific gravity about 1.0). The reaction is carried out at temperatures above 400° C., preferably between about 440° and about 480° C. and under pressures of between 50 and 300, preferably between about 100 and about 250 atmospheres. The reaction conditions may be varied according to the nature of the initial materials. From the phenols the corresponding amines are obtained according to the present invention in practically quantitative yields. It is a considerable advantage of the present invention that crude materials or only commercially pure materials, or pure phenols which have been stored for a long time in iron containers (and which consequently are contaminated with phenolates and substances which are probably oxidation products, polymerization products and the like) may be converted on a technical scale with good yields into the corresponding amines, the activity of the catalyst remaining high for very long periods. While in the conversion of impure phenols in the absence of hydrogen high molecular, asphalt-like compounds and, in some cases, metallic precipitates are formed which damage the catalyst, the presence of hydrogen allows of producing the desired amines even from such by-products and therefore avoids the waste of material and a decrease of the activity of the catalysts.

The following examples will further illustrate the nature of this invention but the invention is not restricted to these examples.

*Example 1*

A high pressure tube lined with copper containing granulated, hydrated alumina is heated to 450° C. and a mixture of 1 volume of crude sym-meta-xylenol containing about 0.02 per cent of iron and 2 volumes of liquid ammonia are pressed into the tube under a pressure of 200 atmospheres. Before the evaporation of the liquid a gas mixture is introduced which consists of 78 per cent of hydrogen and 22 per cent of nitrogen in such an amount that per each volume of liquid meta-xylenol 1000 volumes of the gas mixture calculated on ordinary temperature and pressure are present. The reaction product obtained consists of meta-xylidine, the water formed in the reaction and ammonia dissolved therein. After the removal of water and ammonia pure xylidine is obtained which is completely free from xylenol.

*Example 2*

In an apparatus similar to that described in Example 1 and in the presence of the catalyst described in Example 1, 1 part by volume of crude meta-cresol (containing 0.015 per cent of iron) and 3 parts by volume of ammonia (calculated on the liquid state) are caused to react with one another at 470° C., 500 parts by volume of the gas mixture mentioned in Example 1 being added per each part by volume of cresol. The reaction product is condensed; it contains the water formed in the reaction, dissolved ammonia and meta-toluidine containing only very small amounts of unconverted meta-cresol (between 0 and 2 per cent).

What I claim is:—

1. The process of producing aromatic amines which comprises heating the vapour of a phenol of the benzene series, ammonia and a gas comprising essentially hydrogen in the presence of a catalyst, the catalytically active part of which is selected from the usual dehydrating catalysts under a pressure between 50 and 300 atmospheres.

2. The process of producing aromatic amines which comprises heating to a temperature above 400° C. a crude phenol of the benzene series, ammonia and a gas comprising essentially hydrogen in the presence of a catalyst, the catalytically active part of which is selected from the usual dehydrating catalysts under a pressure between 50 and 300 atmospheres.

3. The process of producing aromatic amines which comprises heating to a temperature between about 440° C. and about 480° C. a crude phenol of the benzene series, ammonia and a gas comprising essentially hydrogen in the presence of a catalyst, the catalytically active part of which is selected from the usual dehydrating catalysts under a pressure between 50 and 300 atmospheres.

4. The process of producing aromatic amines which comprises heating to a temperature between about 440° C. and about 480° C. a crude phenol of the benzene series, ammonia and a gas comprising essentially hydrogen under a pressure between 50 and 300 atmospheres, while employing hydrated alumina as a catalyst.

5. The process of producing aromatic amines which comprises heating to a temperature above 400° C. a crude phenol of the benzene series, ammonia and a gas comprising essentially hydrogen in the presence of a catalyst, the catalytically active part of which is selected from the usual dehydrating catalysts under a pressure between 100 and 250 atmospheres.

6. The process of producing aromatic amines which comprises heating to a temperature between about 440° C. and about 480° C. a crude phenol of the benzene series, ammonia and a gas comprising essentially hydrogen in the presence of a catalyst, the catalytically active part of which is selected from the usual dehydrating catalysts under a pressure between 100 and 250 atmospheres.

7. The process of producing aromatic amines which comprises heating to a temperature between about 440° C. and about 480° C. a crude phenol of the benzene series, ammonia and a gas comprising essentially hydrogen under a pressure between 100 and 250 atmospheres while employing hydrated alumina as a catalyst.

EBERHARD VOGT.